United States Patent
Walters

[11] 3,922,011
[45] Nov. 25, 1975

[54] HOSE COUPLING

[76] Inventor: Tom Walters, 2102 Mason Blvd., Point Pleasant, W. Va. 25550

[22] Filed: Dec. 11, 1973

[21] Appl. No.: 423,726

[52] U.S. Cl. .................. 285/277; 24/218; 285/315; 285/321; 285/DIG. 3; 403/322; 403/326
[51] Int. Cl.² ........................................ F16L 27/00
[58] Field of Search .......... 285/277, 308, 315, 316, 285/317, 321, DIG. 3, DIG. 22, 33, 314; 403/316, 322, 326; 24/218 X, 215, DIG. 17, 211 L

[56] References Cited
UNITED STATES PATENTS

| | | | |
|---|---|---|---|
| 1,657,174 | 1/1928 | Morse | 24/211 L |
| 3,352,576 | 11/1967 | Thorne-Thomsen | 285/169 |
| 3,428,340 | 2/1968 | Pelton | 285/308 X |

Primary Examiner—Werner H. Schroeder
Assistant Examiner—Moshe I. Cohen
Attorney, Agent, or Firm—Clarence A. O'Brien; Harvey B. Jacobson

[57] ABSTRACT

Tubular conduits are swivelly coupled to each other by axially overlapping coupling parts that are axially locked by a single piece annular coupling spring retained in position by an outer operating sleeve. The coupling spring has radially outer segments received in a recess of the operating sleeve from which connecting loops extend radially through openings in a supporting cage projecting from the female coupling part. The radially inner portions of the connecting loops engage the male coupling part in axially spaced relation to the outer segments.

8 Claims, 10 Drawing Figures

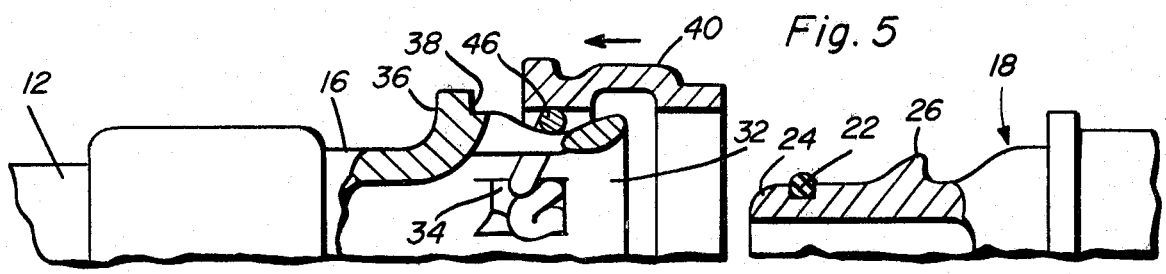
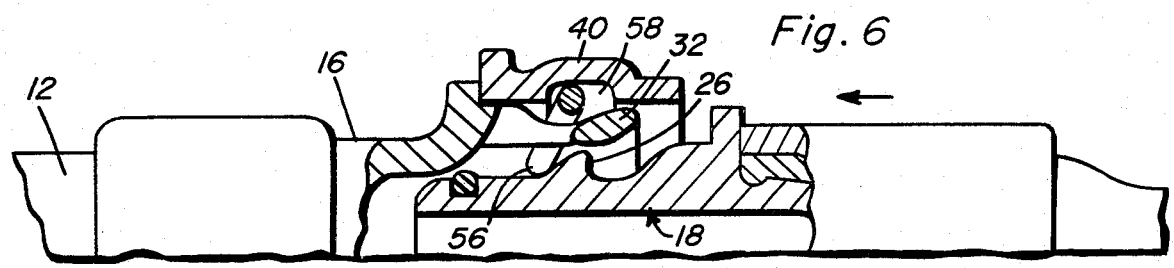
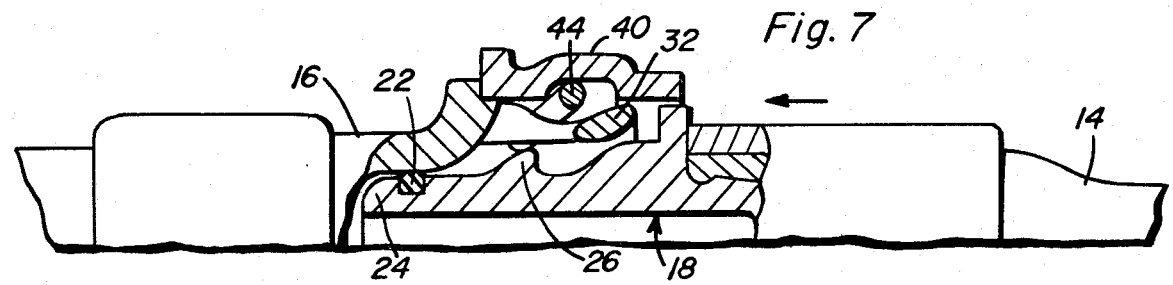
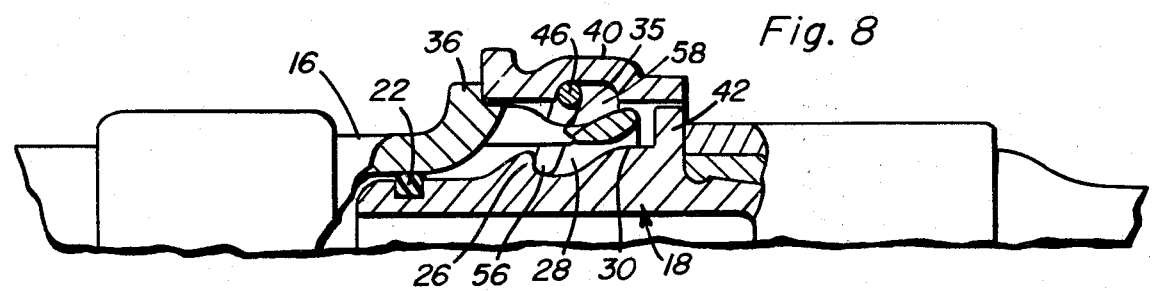
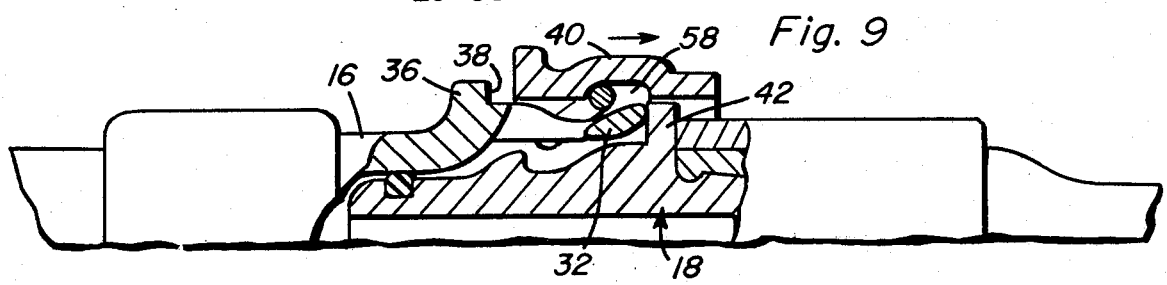
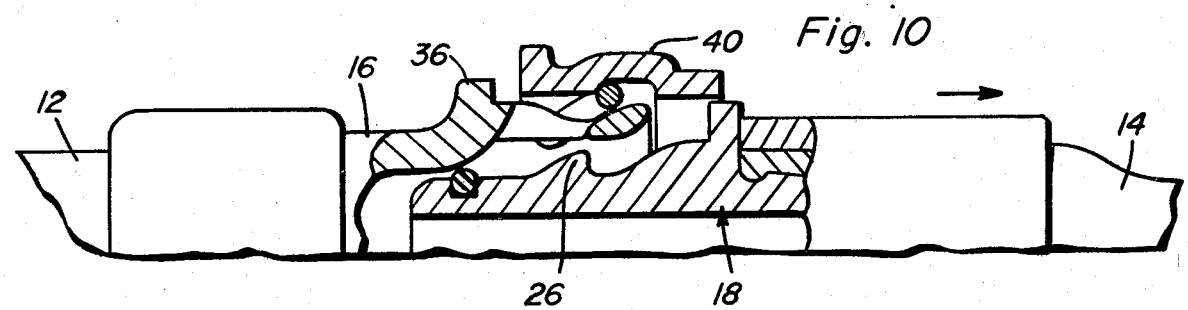

HOSE COUPLING

This invention relates in general to the coupling of tubular conduits and more particularly to a new and useful coupling assembly adapted to quickly and reliably couple and uncouple conduit sections through which pressurized fluid is conducted.

Many coupling assemblies have been devised for accommodating rapid manual coupling and uncoupling of pipe sections with fluid pressure seals. Generally, the manual coupling and uncoupling capabilities of such coupling assemblies are inconsistent with the requirements of heavy duty industrial installations wherein the coupling assembly must withstand damage to seals, spring and other coupling components resulting from torsional stress and strain on pipe strings. Thus, in addition to rugged design features, the coupling assembly must permit a swivel action without damage to the assembly for industrial use. To also endow such heavy duty industrial coupling assemblies with an easy manual coupling and uncoupling capability requires a major breakthrough in the art, which has been achieved by the present invention.

It is, therefore, an important object of the present invention to provide a coupling assembly embodying a simple rugged design for high temperature and pressure and high axial and torsional stress installations, and yet capable of being manually assembled and uncoupled in a reliable and safe fashion.

In accordance with the present invention, a female coupling part is provided with an axially projecting supporting cage on which an annular coupling spring is retained. The coupling spring is of a one-piece "wrinkle" design having radially outer segments interconnected by loops projecting radially inwardly through circumferentially spaced guide openings in the supporting cage. An operating sleeve is assembled over the supporting cage by being pushed into abutment with a stop formation on the female coupling part after radially deforming the outer segments of the coupling spring which are then received in an internal recess formed in the operating sleeve. The male coupling part may then be inserted, and locked in place by a hook formation engaging and radially deforming the radially inner portions of the spring loops which then snap into an annular recess formed on the male coupling part between the hook formation and a radial projection forming a slide bearing support for the operating sleeve. The radially inner portion of the coupling spring in its undeformed condition engages the hook formation on the male coupling part in axially spaced relation to the outer segments. Accordingly, internal fluid pressure within the coupled conduit sections tending to axially separate the coupling parts will exert an axial force on the coupling spring acting as a lever fulcrumed by the support cage to resist any axial displacement of the operating sleeve from its coupling position abutting the stop formation on the female coupling part.

These together with other objects and advantages which will become subsequently apparent reside in the details of construction and operation as more fully hereinafter described and claimed, reference being made to the accompanying drawings forming a part hereof, wherein like numerals refer to like parts throughout.

FIGS. 5 through 10 are partial side section views showing the coupling assembly in different stages of coupling and uncoupling.

Figure 1:
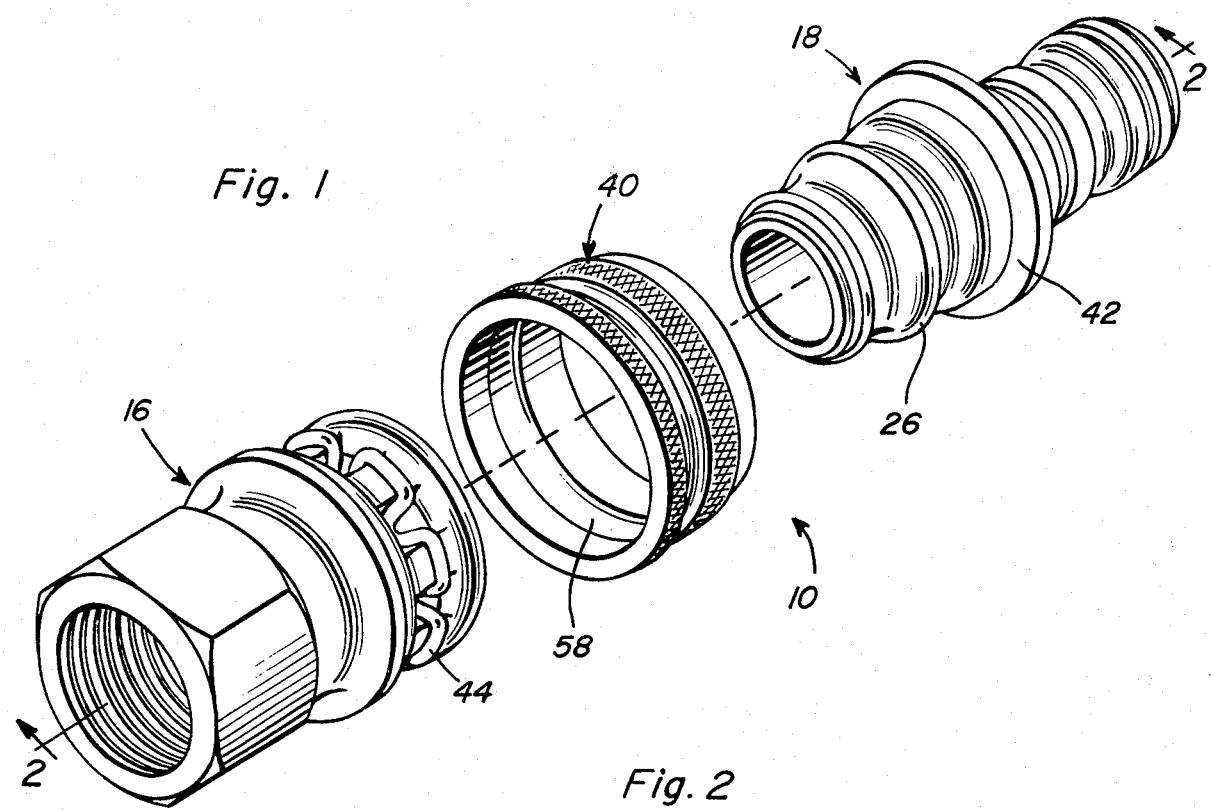
FIG. 1 is a perspective view showing the disassembled parts of the coupling assembly of the present invention.
Figure 2:
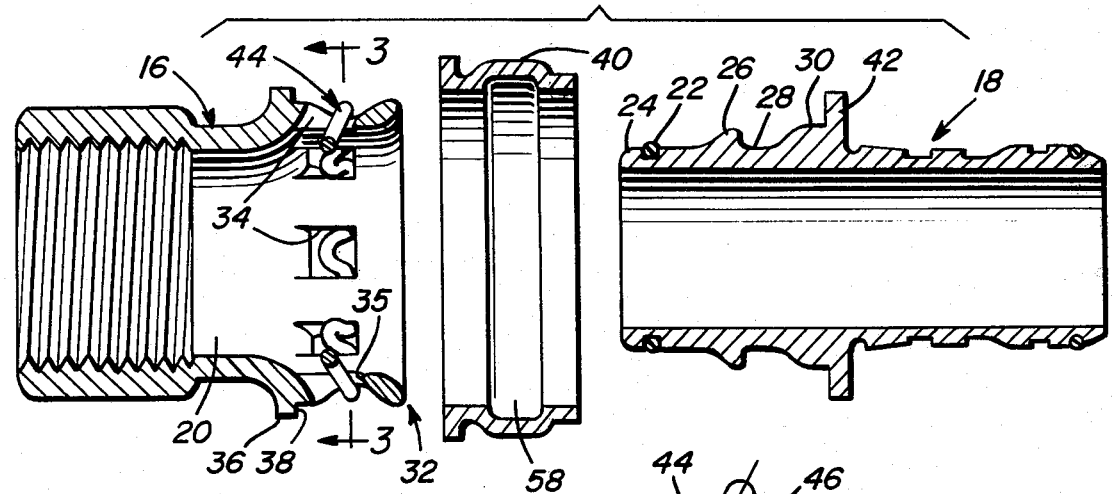
FIG. 2 is a side sectional view through the disassembled parts shown in FIG. 1.

Referring now to the drawings in detail, FIGS. 1 and 2 show a typical coupling assembly 10 constructed in accordance with the present invention. Adjacent conduit sections 12 and 14 are respectively connected to a female tubular coupling member 16 and a male coupling member 18. The female coupling member which forms part of the coupling assembly has an internal sealing surface 20 engaged by an O-ring sealing element 22 seated in an annular recess formed in the inserted end portion 24 of the male coupling member which is externally dimensioned with radial sliding clearance relative to the internal diameter of surface 20.

The male coupling member 18 adjacent to the insert end portion 24, is of larger external diameter formed by an annular hook formation 26 separated by a recess 28 from a slide bearing portion 30 on which the end of a tubular supporting cage 32 is received. The supporting cage projects axially from the female coupling member in surrounding relation to the hook formation 26 and is provided with a plurality of circumferentially spaced openings 34. Fulcrum points 35 are established on the cage in each opening as will be explained hereafter.

The end of the female coupling member from which the supporting cage 32 projects is radially enlarged by a stop formation 36 presenting a shoulder 38 with which an operating sleeve 40 abuts as shown in FIG. 8. The operating sleeve in its coupling position as shown extends in coaxial relation to the coupling members from the stop shoulder 38 over an external slide bearing surface on a radial projection 42 on the male coupling member 18. Thus, the operating sleeve will be slidingly supported for displacement from the coupling position shown in FIG. 8 in an uncoupling direction to the positions shown in FIGS. 9 and 10 on the supporting cage 32 and the radial projection 42.

Figure 3:
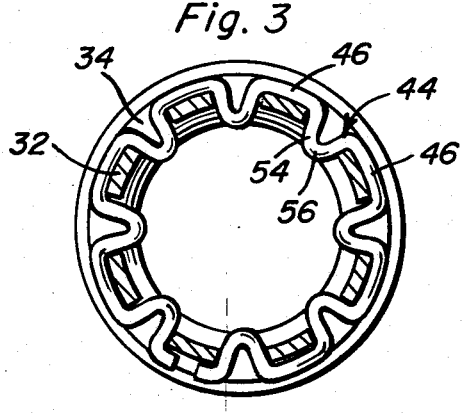
FIG. 3 is a transverse section view taken substantially through a plane indicated by section line 3—3 in FIG. 2 showing the coupling spring.
Figure 4:
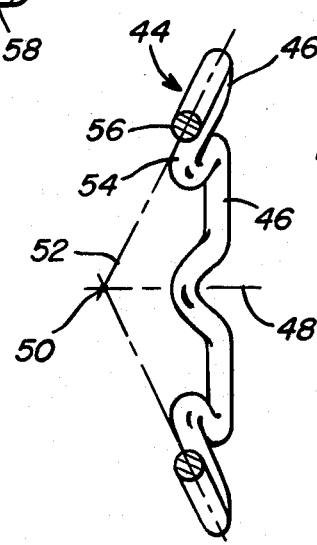
FIG. 4 is a side section view through the coupling spring.

The supporting cage 32 retains an annular coupling spring 44 in operative position in the coupling assembly. As more clearly seen in FIGS. 3 and 4, the coupling spring is made of a single piece, elastically deformable wire of generally uniform cross-section having a generally conical, wrinkle configuration. The spring configuration comprises a plurality of radially outer segments 46 having a common center of curvature lying on an axis 48 of the spring intersecting the apex 50 of a conical surface 52 with which loop portions 54 of the spring are aligned. The loops 54 interconnect the outer segments 46 and extend radially inwardly therefrom through the guide openings 34 in the supporting cage by means of which the coupling spring is retained on the supporting cage 32 and its deformation constrained or guided. The radially inner ends 56 of the loops 54 engage the hook formation 26 of the male coupling member in axially spaced relation to the outer segments 46 which are received within an internal recess 58 of the operating sleeve.

In assembling the coupling assembly, the operating sleeve 40 is initially placed over the supporting cage 32 as shown in FIG. 5, deforming the outer segments 46 of the coupling spring radially inwardly until the operating sleeve is in abutment with stop shoulder 38. The coupling spring then returns to its undeformed condition with the outer segments received in recess 58 of the operating sleeve in preparation for reception of the male coupling member. Upon insertion of the male coupling member as shown in FIGS. 6 and 7, the coupling spring is axially and radially deformed by the engagement of the radially inner ends 56 of loops 54 by the hook formation 26 permitting it to pass therethrough. When the male coupling member reaches its coupled position, it is locked against withdrawal by the coupling spring returning to its undeformed condition with the inner ends 56 of the loops received in annular recess 28.

Any internal fluid pressure in the coupled conduit sections tending to axially separate the coupling members 16 and 18 is resisted by the coupling spring opposing the force exerted by the hook formation 26 on the radially inner ends 56 of the spring. Any axial force applied to the spring as a result of this internal pressure will be transmitted to the operating sleeve 40 by a lever action about the fulcrum points 35 on the support cage to hold the operating sleeve in abutment with the stop formation 36 and prevent uncoupling. Nevertheless, the coupling spring will permit relative angular displacement between the coupling members because of the angular sliding relationship between the outer segments 46 and the operating sleeve within recess 58 and a similar sliding relationship in recess 28 with the radially inner ends 56 of the coupling spring. This swivel relationship between the coupling members in the coupled condition, will help avoid twists and kinks in the pipe string in which the coupling assembly is installed.

To uncouple the coupling assembly, when the internal fluid pressure is removed, the operating sleeve is displaced away from the stop formation 36 as shown in FIG. 9 to axially deform the coupling spring whereby its radially inner ends 56 are deformed radially outwardly to permit passage of the hook formation 26 and withdrawal of the male coupling member. Deformation of the coupling spring 44 during the foregoing uncoupling action is constrained by the guide openings 34 through which the loop portions 54 project to uniformly distribute radial expansion of the spring and thereby preclude binding.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a pair of axially overlapping members adapted to be rotatable relative to each other about a common axis, a coupling assembly comprising an annular spring element, spring retaining means projecting from one of said members in surrounding relation to the other of the members holding the spring element in an elastically undeformed condition, a hook formation projecting radially outwardly from the other of said members axially between the spring element and a shoulder formed axially inwardly from said spring retaining means on said one of the members when the members are coupled together, an operating sleeve having an internal recess receiving said spring element in the undeformed condition thereof, means connected to both of said members jointly supporting the operating sleeve in said coupled position, and means limiting axial displacement of the operating sleeve in one direction against the bias of said spring element from a coupling position in which said spring element is received in the recess.

2. The combination of claim 1 wherein said spring retaining means includes an annular supporting cage having circumferentially spaced openings through which the spring element projects radially outwardly into the recess of the operating sleeve and radially inwardly into engagement with the hook formation and fulcrum means on the cage for rendering the spring element operative to transmit force between the other of the members and the operating sleeve.

3. The combination of claim 2 wherein said limiting means comprises an annular stop formation connected to said one of the members abutting the operating sleeve in the coupling position thereof.

4. The combination of claim 3 wherein said sleeve supporting means includes a radial projection connected to the other of the members in abutment with the spring retaining means and external slide bearing surfaces formed on the radial projection and the spring retaining means slidably supporting the operating sleeve thereon in coaxial relation to said members.

5. The combination of claim 4 wherein said spring element includes radially outer segments received within the recess of the operating sleeve, radially inner portions axially spaced from said outer segments in circumferentially staggered relation thereto, and connecting sections extending between the outer segments and the radially inner portions to define a generally conical configuration, said spring element being deformable in axial and radial directions by the operating sleeve and the hook formation during coupling and uncoupling of the members.

6. The combination of claim 1 wherein said limiting means comprises an annular stop formation connected to said one of the members abutting the operating sleeve in the coupling position thereof.

7. The combination of claim 1 wherein said sleeve supporting means includes a radial projection connected to the other of the members in abutment with the spring retaining means and external slide bearing surfaces formed on the radial projection and the spring retaining means slidably supporting the operating sleeve thereon in coaxial relation to said members.

8. The combination of claim 1 wherein said spring element includes radially outer segments received within the recess of the operating sleeve, radially inner portions axially spaced from said outer segments in circumferentially staggered relation thereto, and connecting sections extending between the outer segments and the radially inner portions to define a generally conical configuration, said spring element being deformable in axial and radial directions by the operating sleeve and the hook formation during coupling and uncoupling of the members.

* * * * *